May 12, 1964  P. J. ERNISSE  3,132,574
AUTOMATIC TAKE-UP DEVICE

Filed Jan. 9, 1963  2 Sheets-Sheet 1

PAUL J. ERNISSE
INVENTOR.

BY R. Frank Smith
David P. Ogden

ATTORNEYS

May 12, 1964 P. J. ERNISSE 3,132,574
AUTOMATIC TAKE-UP DEVICE
Filed Jan. 9, 1963 2 Sheets-Sheet 2

PAUL J. ERNISSE
INVENTOR.

BY R. Frank Smith
David P. Ogden

ATTORNEYS

United States Patent Office 3,132,574
Patented May 12, 1964

3,132,574
AUTOMATIC TAKE-UP DEVICE
Paul J. Ernisse, Rochester, N.Y., assignor to Eastman Kodak Company, Rochester, N.Y., a corporation of New Jersey
Filed Jan. 9, 1963, Ser. No. 250,418
9 Claims. (Cl. 95—31)

This invention relates to an automatic take-up device and more particularly to an automatic take-up device having an overrunning clutch with positive engagement therein.

In the art of automatic take-up devices, many energizing components have been used in the prior art. However, when such devices are provided in hand-carried equipment such as miniature cameras, the most acceptable device must be lightweight and noiseless. Light weight may be accomplished by the provision of a watch spring-type energy storing component, which may be wound by unidirectional clutches. Most ratchet-type unidirectional clutches operate with a slight clicking sound, which is not always pleasant. Therefore, I prefer to use a noiseless overrunning clutch.

In the art of unidirectional overrunning clutches, many devices use a friction drive and are made of materials such as metals which will withstand repeated use and the high stresses resulting in the friction engagements therein. Usually, the use of suitable metal parts to assure durable friction drives results in a heavier device than can be provided with soft metals or plastic elements. Because of the technological improvements in plastics, more consumer product producers are using plastics for forming critical portions of various equipments. On the other hand, although suitably accurate tolerances in extruded or injection-molded products are repeatedly attainable by process control techniques using plastics, most plastics do not readily lend themselves to utilization in the well-known friction clutch components of the unidirectional overrunning type. Such an arrangement might result in unacceptable wear characteristics in a film take-up drive.

Therefore, an object of the present invention is to provide a simple and reliable automatic film take-up device.

A further object of the present invention is to provide a simple and reliable positive drive unidirectional clutch.

One embodiment of the present invention utilizes a watch spring-type film take-up device provided with a pair of unidirectional clutches for energizing the spring. In each clutch a toothed gear member is selectively engageable by a toothed roller positionable a variable distance from the gear in accordance with the configuration of its housing recess. A portion only, such as one end, of the housing recess is provided with gear-like teeth which prevent relative rotation of the toothed roller when it resides therein. Thus, the housing recess and the housing is secured to the gear by the toothed roller when the relative movement is such that the roller is driven into the toothed portion of the housing recess. The housing and gear are not drivably coupled when the toothed roller is in the smooth portion of the housing recess. The watch spring drive of the film take-up device is accomplished by using one such unidirectional clutch to tension the spring and a second such clutch to prevent loss of the energy stored in the tensioned spring.

The subject matter which is regarded as my invention is particularly pointed out and distinctly claimed in the concluding portion of this specification. The invention, however, as to its organization and operation, together with further objects and advantages thereof, will best be understood by reference to the following description taken in connection with the accompanying drawings in which:

Figure 1:
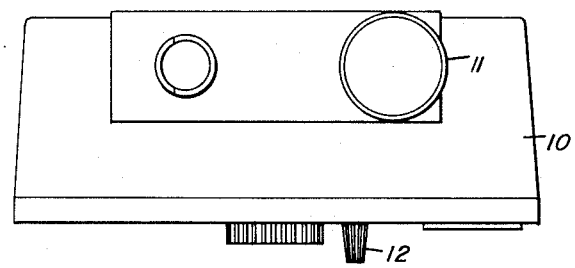
FIG. 1 is a top plan view of a camera arranged to utilize the present invention.

Referring now to the drawings in which like numbers refer to similar parts, in FIG. 1 I have shown a camera 10 provided with a take-up spool winding knob 11 which is drivable to store energy in a spool drive spring. Thus, the operator moves the film after each exposure by simply releasing the mechanism to allow the drive spring to advance the film. By way of example, the film may be moved to position an unexposed portion of the film to an exposure portion of the camera 10 by a simple unlatching operation, accomplished by a trip mechanism coupled to a camera shutter control 12. With such an arrangement, a photographer is more easily able to accomplish a sequence of photographs which are closely spaced in time. Thus, by using the present invention, after energizing the take-up spool drive spring by winding of the winding knob 11, the photographer may take a picture sequence of ten or more exposures within a matter of a few seconds simply by operating the shutter.

Figure 2:
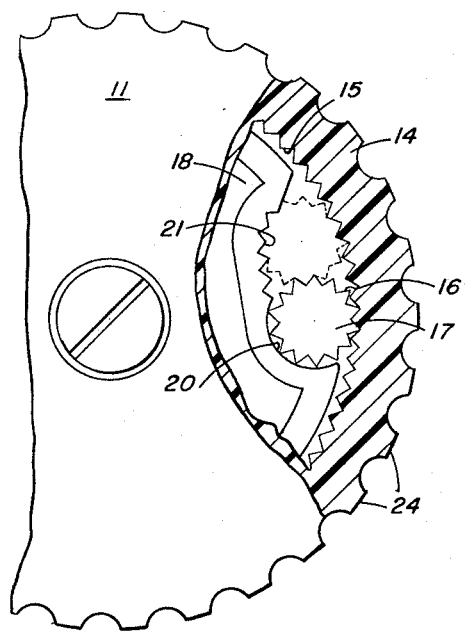
FIG. 2 is a top plan view partially cut away illustrating a single unidirectional clutch of the present invention.

In FIG. 2, I have shown one embodiment of the present invention wherein the annular surface of the winding knob 11 is a toothed ring gear 14. The annular gear teeth 15 are internally directed to continuously engage the gear teeth 16 of a toothed roller 17. The toothed roller 17 is floating in the sense that it has no fixed bearing means. It is contained within a recess region of its housing 18, which is mounted so that it may be rotated coaxially with the gear 14. The housing 18 is also coupled by the unidirectional clutch to transmit energy developed therein by manual operation of the toothed gear portion of the winding knob 11. The recess region in the housing 18 is provided with two substantially different recess sections 20 and 21. The recess section 20 has a smooth inner surface, which will allow the toothed roller 17 to rotate freely therein so long as the gear teeth 15 move clockwise relative to the housing 18. However, the recess section 21 is provided with mating gear teeth, which will ultimately prevent rotation of the toothed roller 17 when it resides in this section 21, and the gear teeth 15 are rotated in a counterclockwise direction relative to the housing 18. Also, the recess region is tangentially tapered so that the roller 17 is pushed tightly against the gear teeth 15 during a driving operation. Such a taper alleviates manufacturing tolerance problems without sacrificing a good driving connection.

Thus, it is seen that I have provided a unidirectional positive gear drive between the gear teeth 15 and the toothed roller 17. The tolerances and spacings provided are such that the roller 17 is always engaged by and will always respond to motion of the gear teeth 15. When this motion is in a clockwise direction, the roller proceeds to the slipping recess section 20 where it may freely rotate without driving the housing 18. When the motion of the gear teeth 15 is in the counterclockwise direction, the roller 17 is driven to the nonslipping or driving recess section 21, where it tightly engages both the gear teeth within the recess section to prevent further rotation and the gear teeth 15 to couple the winding knob 11 to the housing 18.

Figure 3:
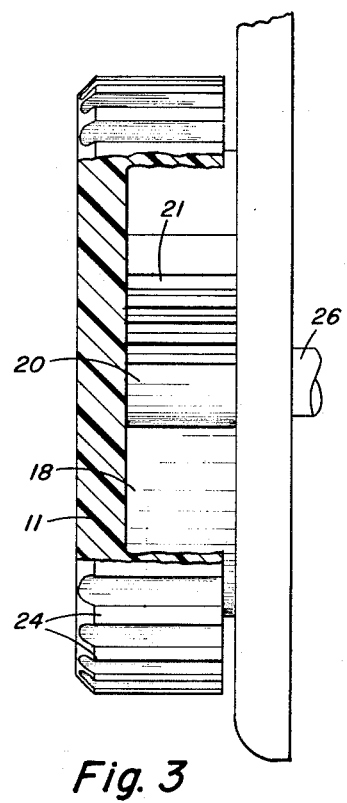
FIG. 3 is a side view partially cut away of the embodiment shown in FIG. 2.
Figure 4:
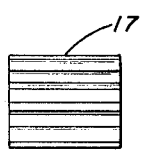
FIG. 4 is a plan view of one toothed roller.

Referring now to FIG. 3, I have shown in side view cutaway section the winding knob 11 to illustrate the housing 18 with the roller 17 shown in FIG. 4. As is clearly illustrated in FIG. 3, the recess section 20 is provided with a smooth inner surface, while the recess section 21 is provided with gear teeth. It should also be noted that the winding knob 11 is provided with peripheral serrations 24 to improve its torsional friction characteristic. The energy transmitted to the housing 18 is transferred to other operating components such as a spring drive means by a shaft 26.

Figure 5:
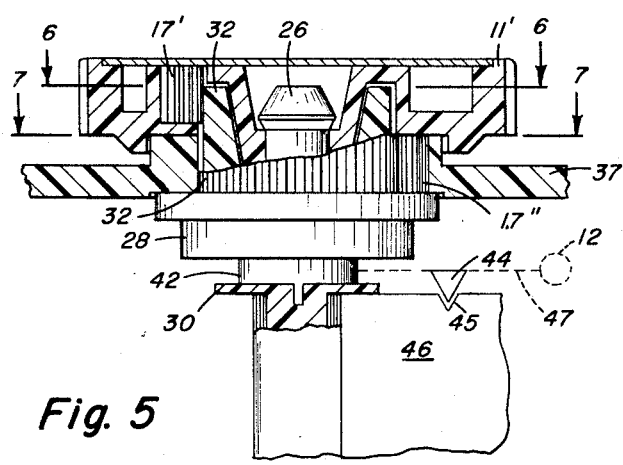
FIG. 5 is a cross-sectional view of a watch spring-type take-up spool drive of the present invention.

Referring now to FIG. 5, I have shown a winding knob 11' coupled to energize a watch spring 28 which will drive a take-up spool 30. Although the inner construction of the winding knob 11' is inside out compared to that of FIG. 2, that is, the gear member is inside the toothed roller, it embodies the positive-drive concept of the present invention. The winding knob 11' is coupled through two unidirectional clutches and the energy-storing spring 28 to the take-up spool 30. The first clutch drives a gear 32, having an annular toothed surface, and the second clutch effects a lock of the gear 32 against the spring torque when the winding knob 11' is released.

Thus, the winding knob 11' defines a pair of recess sections 34 and 35 (FIG. 6) suitable for housing a toothed roller 17'. The recess section 34 is similar to that illustrated in FIG. 2 at 20 and is also provided with a smooth inner surface. Similarly, the recess section 35 is provided with gear teeth equivalent to those in recess section 21 of FIG. 2. In this instance, the gear 32 is driven by the toothed roller 17' instead of driving the roller, as in FIG. 2. However, the operation of my invention is the same with the clockwise rotation of the winding knob 11' resulting in the toothed roller 17' residing in the tooth recess 35 so that rotational forces are transmitted to the gear 32. However, a counterclockwise rotation of the winding knob 11' causes the gear teeth of the gear 32 to drive the toothed roller 17' into the smooth recess section 34 whereby the coupling is released.

In FIG. 5, I have also shown a toothed roller 17'', which co-operates between the gear 32 and the housing 37 of the camera by selectively coupling them together to prevent loss of tension. As shown more clearly in FIG. 7, the housing 37 is also provided with a pair of recess sections 39 and 40 with the section 39 having a smooth inner surface and the section 40 being provided with teeth which will prevent rotation of the toothed roller 17''. When the winding knob 11' transmits energy to the gear 32 by being rotated in the clockwise direction, the roller 17'' is driven by the gear 32 to the smooth surface recess section 39 and thereby releases the gear 32 to allow rotation thereof. At such time as the winding knob 11' is released, any bias tending to rotate the gear 32 in a counterclockwise direction will result in the toothed roller 17'' being moved to the toothed recess section 40, thereby preventing further rotation of the gear 32. In order to minimize backlash, we prefer that the tangential spacing of the recesses 39—40 be reduced as much as feasible.

Figure 7:
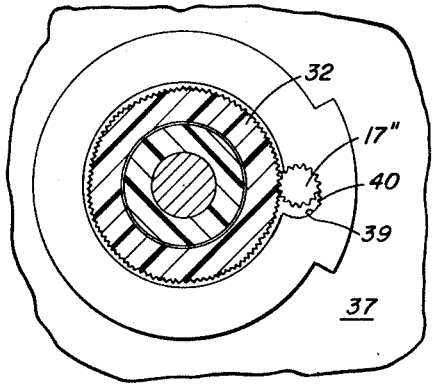
FIG. 7 is a sectional view taken along the lines 7—7 of FIG. 5.
Figure 6:
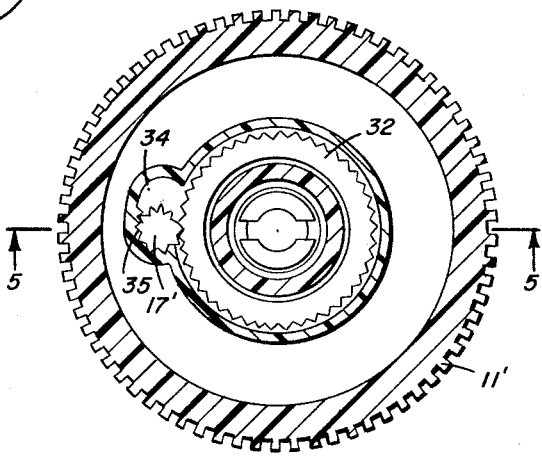
FIG. 6 is a sectional view taken along the lines 6—6 of FIG. 5.

As shown more clearly in FIG. 5, the combined operation of the winding knob 11' and the two unidirectional clutches shown in FIGS. 6 and 7 respectively results in the drive shaft 26 coupled to the gear 32 tensioning the watch spring 28. The energy thus stored in the spring 28 is transmitted by a drive shaft 42 to the take-up spool 30 in the camera 10. In one particular camera, the rotation of the spool 30 is prevented in accordance with the engagement of a pawl 44 in an aperture or notch 45 in the film 46. Operation of the shutter control 12 raises by means of linkage 47 (dashed lines) the pawl 44 after the shutter has opened and closed to release the drive shaft 42 so that it may drive the take-up spool 30. The film 46 is thereby wound on the take-up spool 30 until the pawl 44 drops into a second notch to again stop the shaft 42.

While I have shown and described particular embodiments of the present invention, other modifications may occur to those skilled in this art. For instance, three or more toothed rollers may be provided within each unidirectional clutch to increase its torsional strength. I intend, therefore, to have the appended claims cover all modifications which fall within the true spirit and scope of my invention.

I claim:
1. An automatic take-up device for driving a film take-up spool in a camera housing comprising:
   a spring coupled to transimt stored energy therein to the film take-up spool;
   a first unidirectional clutch mechanism selectively coupling the camera housing to said spring to prevent unwinding thereof;
   a winding knob;
   a second unidirectional clutch mechanism coupling said winding knob to said spring so that energy for tensioning said spring can be transmitted therebetween;
   said first and second unidirectional clutch mechanisms each including a toothed roller positionable in a smooth surface slipping recess section;
   said first and second unidirectional clutch mechanisms each including annular gearing which continuously engages its respective toothed roller;
   said toothed roller in said first unidirectional clutch being drivable from said smooth surface recess section by its respective gear member to a toother nonslipping recess section in response to bias developed by said spring to prevent unwinding thereof; and
   said toothed roller in said second unidirectional clutch being drivable to a toothed nonslipping recess section by its respective gear member in response to torque applied thereto by said winding knob whereby said winding knob is coupled to energize said spring through said second unidirectional clutch.

2. An automatic take-up device for driving a film take-up spool in a camera housing in accordance with the condition of the shutter in the camera, comprising:
   a spring coupled to transmit energy to the film take-up spool;
   a latch arranged to prevent movement of the spool during exposure of a film secured thereto;
   an exposure control means operatively associated with said latch so that the film may be advanced by said spring after each exposure;
   a first unidirectional clutch coupling the camera housing to said spring to prevent unwinding thereof;
   a winding knob;
   a second unidirectional clutch coupling said winding knob to said spring so that energy for tensioning said spring can be transmitted therebetween;
   a first floating toothed roller in said first unidirectional clutch;
   a second floating toothed roller in said second unidirectional clutch, each of said toothed rollers being selectively positionable in a smooth surface slipping recess section of a housing portion of said clutches respectively; and
   a gear member in said first and second unidirectional clutches respectively coaxial with said housing portion and arranged to continuously engage its respective toothed roller,
   said toothed roller in said first unidirectional clutch being drivable from said slipping recess section by its respective gear member to a driving toothed recess section in response to bias developed by said spring, and
   said toothed roller in said second unidirectional clutch being drivable from said slipping recess section to a driving toothed recess section by its respective gear member in response to torque applied to said winding knob whereby said winding knob is coupled to energize said spring through said second unidirectional clutch and said first unidirectional clutch couples said spring to the camera housing to prevent unwinding thereof.

3. An automatic take-up device for driving a film take-up spool in a camera housing in accordance with the condition of the shutter in the camera, comprising:

a spring coupled to transmit energy to the film take-up spool;

a latch arranged to prevent movement of the spool during exposure of a film secured thereto;

an exposure control means operatively associated with said latch so that the film may be advanced by said spring after each exposure;

a winding knob;

means for coupling said winding knob to said spring so that energy for tensioning said spring can be transmitted therebetween;

a unidirectional clutch coupling the camera housing to said spring to prevent unwinding thereof;

a floating toothed roller in said unidirectional clutch selectively positionable in a smooth surface slipping recess section of a housing portion of said clutch; and a gear member in said clutch coaxial with said housing portion and arranged to continuously engage said toothed roller;

said toothed roller being drivable from said smooth surface recess section by said gear member to a nonslipping toothed recess section in response to bias developed by said spring, to couple said spring to the camera housing to prevent unwinding thereof.

4. An automatic take-up device for driving a film take-up spool in a camera housing in accordance with the condition of the shutter in the camera, comprising:

a spring coupled to transmit energy to the film take-up spool;

a latch arranged to prevent movement of the spool during exposure of a film secured thereto;

an exposure control means operatively associated with said latch so that the film may be advanced by said spring after each exposure;

means for coupling said spring to the camera housing to prevent unwinding thereof;

a winding knob;

a unidirectional clutch coupling said winding knob to said spring so that energy for tensioning said spring can be transmitted therebetween;

a floating toothed roller in said unidirectional clutch selectively positionable in a smooth surface slipping recess section of a housing portion of said clutch; and a gear member in said clutch coaxial with said housing portion and arranged to continuously engage said toothed roller;

said toothed roller being drivable from said smooth surface recess section by said gear member to a driving toothed recess section in response to torque developed in said winding knob to drivingly couple said spring to said winding knob.

5. An automatic take-up device including a unidirectional clutch, comprising:

a toothed roller;

a pair of coaxial members arranged to be selectively torsionally coupled by said toothed roller;

a first member of said pair defining annular gear teeth arranged to continuously drivingly engage the teeth of said toothed roller; and the second member of said pair defining a first recess section having a smooth inner surface and being spaced from said gear teeth so that the toothed roller continuously engages the gear teeth during residence in the smooth recess section, said second member defining a second recess section adjacent to the first and having gear teeth on the inner surface thereof to prevent rotation of said toothed roller therein, whereby when said toothed roller resides in the gear recess section a driving connection may be established between said pair, said second member defining a passage between the smooth and the gear recess sections arranged to allow movement therebetween by said toothed roller in response to extended relative rotation of said pair whereby when said toothed roller is driven into the gear recess section a driving coupling is established between said pair and opposite relative rotation between said pair releases the driving coupling.

6. An automatic take-up device including a unidirectional clutch, comprising:

a floating toothed roller;

a pair of coaxial members arranged to be selectively torsionally coupled by said toothed roller;

a first member of said pair defining annular gear teeth arranged to continuously drivingly engage the teeth of said toothed roller; and the second member of said pair defining a recess region for containing said toothed roller with the region having a smooth inner surface section and a gear tooth inner surface section and being spaced from said gear teeth of said first member so that the toothed roller continuously engages the gear teeth during residence in the recess region, said toothed roller being free to rotate in the smooth section in response to one relative rotation of said pair and drivingly coupling said gear tooth section to said annular gear teeth in response to opposite relative rotation of said pair.

7. A unidirectional clutch device comprising:

a floating toothed roller;

a pair of coaxial members arranged to be selectively torsionally coupled by said toothed roller;

a first member of said pair defining annular gear teeth arranged to continuously drivingly engage the teeth of said toothed roller; and the second member of said pair defining a recess region for containing said toothed roller with the region having a smooth inner surface section and a gear tooth inner surface section and being spaced from said gear teeth of said first member so that the toothed roller continuously engages the gear teeth during residence in the recess region, said toothed roller being free to rotate in the smooth section in response to one relative movement of said pair and drivingly coupling said gear tooth section to said annular gear teeth in response to opposite relative movement of said pair, said gear tooth inner surface section being arranged to drive said toothed roller tightly against said annular gear teeth to enhance the driving coupling therebetween.

8. A unidirectional clutch device comprising:

a toothed roller;

a first member;

a second member arranged to be coupled to said first member by said toothed roller, said first and second members defining an annular space therebetween having a radial depth less than the diameter of said toothed roller, one of said members having gear teeth throughout the region of said annular space, the other of said members defining a recess region for maintaining said toothed roller in contact with the gear teeth; and said recess region including a smooth inner surface portion enhancing free rotation of the said toothed roller in response to one relative rotation of said members and including an adjacent section having a surface for engaging the toothed roller to prevent rotation thereof in response to opposite relative rotation of said members.

9. A unidirectional clutch device comprising:

a toothed roller;

a first member;

a second member arranged to be coupled to said first member by said toothed roller, said first and second members defining a coaxial annular space therebetween having a radial depth less than the diameter of said toothed roller, one of said members having gear teeth throughout the region of said annular space, the other of said members defining a relatively short recess region for maintaining said toothed roller in contact with the gear teeth; and said recess region including a first smooth inner surface section enhancing free rotation of the said toothed roller in response to one relative rotation of said members and said recess region including a second adjacent section having a surface for engaging the toothed roller to prevent rotation thereof in response to opposite relative rotation of said members, said second recess section being shallower than said first section to drive said toothed roller tightly against said gear teeth when a driving coupling is established.

No references cited.